Dec. 25, 1973   M. G. HICKS   3,781,200
FLUOROCARBON AND OXYGEN-PROVIDING COMPOUND
TREATMENT OF WASTE WATERS
Filed Sept. 18, 1972

United States Patent Office 3,781,200
Patented Dec. 25, 1973

3,781,200
FLUOROCARBON AND OXYGEN-PROVIDING COMPOUND TREATMENT OF WASTE WATERS
Manuel Grant Hicks, 1927 S. 8th St., Omaha, Nebr. 68108
Continuation-in-part of abandoned application Ser. No. 139,986, May 3, 1971. This application Sept. 18, 1972, Ser. No. 290,159
Int. Cl. B01d 11/04
U.S. Cl. 210—21           5 Claims

ABSTRACT OF THE DISCLOSURE

A process of using heavy Freon as a solvent for $H_2O_2$, ozone, oxygen or air for carrying these oxygen providers beneath a body of sewer water so that oxygen diffuses upwardly into the water from the Freon to control septic odors or to cause aerobes to thrive and so that material such as fat in the water is dissolved in the Freon to facilitate its extraction.

---

This application is a continuation-in-part of patent application Ser. No. 139,986, filed May 3, 1971 and now abandoned.

FIELD OF THE INVENTION

This invention is in the field of the treatment of waste waters such as sewer waters and industrial waste waters.

This is a field in which oxygen has been added to such waste waters by means of inserting air, ozone, oxygen or hydrogen peroxide into the waters for purposes of control of septic odors or for the purpose of feeding oxygen to aerobic bacteria in a manner for causing them to thrive so that they can devour organic wastes to make the water clear.

To a lesser extent, this invention is in the broad field of the use of solvents to extract fats from bodies of water.

DESCRIPTION OF THE PRIOR ART

In prior art processes for delivery of oxygen to waste waters, as described, a serious problem exists in delivery of the gaseous substances such as air, ozone and oxygen because when these gases are added to water a large portion of the gas added "bubbles out" wastefully and neither reacts with hydrogen sulfide in the water, nor does it feed aerobes. Therefore such processes have terribly high costs.

Hydrogen peroxide can be delivered to waste waters from containers of an aqueous solution of hydrogen peroxide. This method delivers the oxygen from the peroxide in a way such that it is eaten by aerobes and reacts with $H_2S$. But this method also has a disadvantage.

This disadvantage is that when aqueous solution, hydrogen peroxide, is poured into the waste water, it tends to go in at a concentrated point wherever it is delivered and to mix outwardly from there at a slow rate. A more desirable speed can be attained by my invention by means of which the hydrogen peroxide solution, air, ozone or oxygen is dissolved in heavy Freon in a first stage and then thereafter delivered to the waste water so that the heavy Freon promptly sinks below the waste water and spreads rapidly across the bottom of a body of waste water providing a large interface at the top of the Freon layer from which oxygen diffuses upwardly into the body of the water, whereby its delivery into the water is much more efficient and its contact with the waste water is over a much larger area than if it is simply poured into the top of the waste water at one or a few points without Freon as a solvent carrier thereof.

The removal of fat from waste water in the past has been expensive. The economical fat removal process of this invention is to dissolve fat into a lower Freon layer beneath fat-containing waste water, then removing the Freon with its dissolved fat from a waste water tank to a second stage where the fat is removed from the Freon, and then returning the Freon to the waste water tank to dissolve more fat by recycling.

SUMMARY OF THE INVENTION

A process of delivering a heavy Freon solution containing Freon which is heavier than water in which is dissolved an oxygen containing compound selected from the group consisting of hydrogen peroxide, ozone, oxygen and air in a process of delivering Freon containing at least one such compound into a body of water such as sewer water to which it is desired to deliver the oxygen by the diffusion of the oxygen upwardly from the Freon after the Freon is beneath said body of water, into said body of water, the Freon being continuously removed to be again mixed with more of the $H_2O_2$ or other oxygen containing compound, and then redelivered to the body of water either from the top thereof or from the bottom thereof, the delivery point being optionally, either at the top of the body of water or beneath the water at any point.

The above process in which the body of water specifically is waste water containing Freon soluble matter, such as fat, and in which the Freon is used as a solvent to dissolve the Freon-soluble matter from the water, the Freon containing the fat being continuously drawn off and taken to a further stage, at which the fat and the Freon are separated so that the Freon can then be reused by reinsertion back into the waste water to dissolve more fat by recycling.

The process of placing Freon and a material containing water into a container, the material having in it Freon soluble matter and Freon insoluble matter whereby the Freon is disposed to the underside of the water, allowing the Freon to dissolve the Freon soluble matter from the water thereabove, next separating the Freon which then contains said Freon soluble matter from the water, next extracting the Freon from the Freon-soluble matter.

DESCRIPTION OF THE PREFERRED EMBODIMENT

Figure 1:
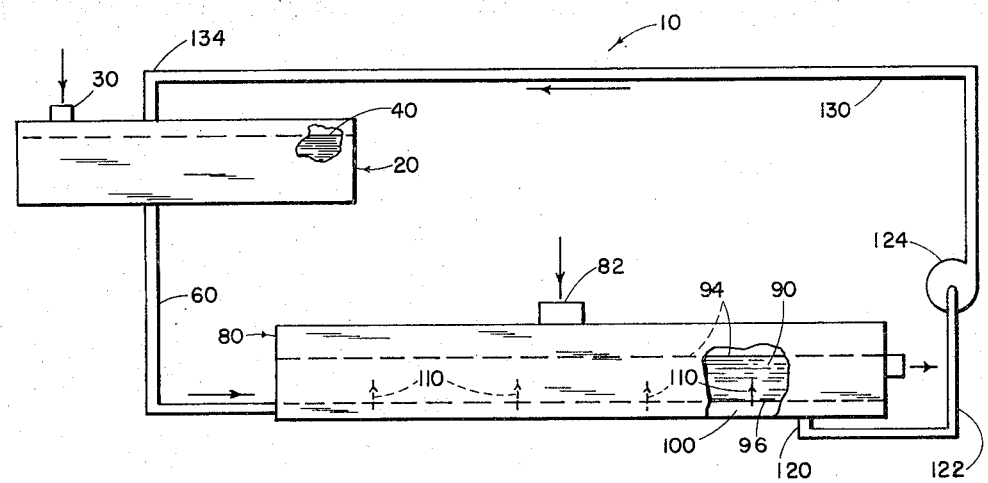
FIG. 1 is a flow diagram of the oxygen-providing system of this invention as used with hydrogen peroxide and Freon.

In FIG. 1 a preferred process of this invention is diagrammed in which Freon, which is in a liquid form and heavier than water, is placed in a first container 20 of an extraction system generally indicated at 10. The Freon can be inserted in a container 20 through an inlet 30 and also into the container 20 is inserted a water solution of hydrogen peroxide, for example, a 3% water solution of hydrogen peroxide, and the mixture so formed is indicated at dotted lines at 40.

The liquid mixture 40 is delivered through a pipe 60 to a second container 80 in which is disposed the body of water 90 having an upper surface 94 and a lower surface 96.

The body of water 90 can be waste water or sewer water or other water to which it is desired to deliver oxygen from the hydrogen peroxide.

The mixture of hydrogen peroxide and Freon flows across the bottom of the container 80 forming a layer of the mixture indicated at 100, the upper surface of which forms an interface with the lower surface 96 of the water 90.

Oxygen from the hydrogen peroxide will diffuse upwardly from the mixture layer 100 into the body of water 90, as indicated by the arrows 110.

While the mixture 40 is continuously entering the second container 80, it is also being continuously drawn off from the bottom thereof at an outlet 120 through a pipe 122 to a pump 124 which pumps the mixture 40 back up through a pipe 130 to an inlet 134 of the first tank 20 so that Freon, which is "spent" by being divested of much of its oxygen, is recirculated back to the first container 20 where it is refreshed by mixing with a new supply of hydrogen peroxide which can continuously be caused to enter the inlet 30 so that the Freon itself recirculates and is re-used.

Referring to FIG. 1, if the body of water 90 is waste water containing Freon soluble matter, such as fat, then the Freon and fat would be removed as a solution through the outlet 120, but the pipe 130, instead of being connected to the pump 124, as shown in FIG. 1, would instead be connected to a separation means indicated at 150, which latter receives its solution of Freon and Freon soluble matter from the pump 124 through a pipe 164.

The purpose of the separation means or separation assembly 150 is to cause the Freon to be delivered to the pipe 130, but the Freon soluble matter to be delivered out an outlet 200 after it is separated from the Freon.

Figure 2:
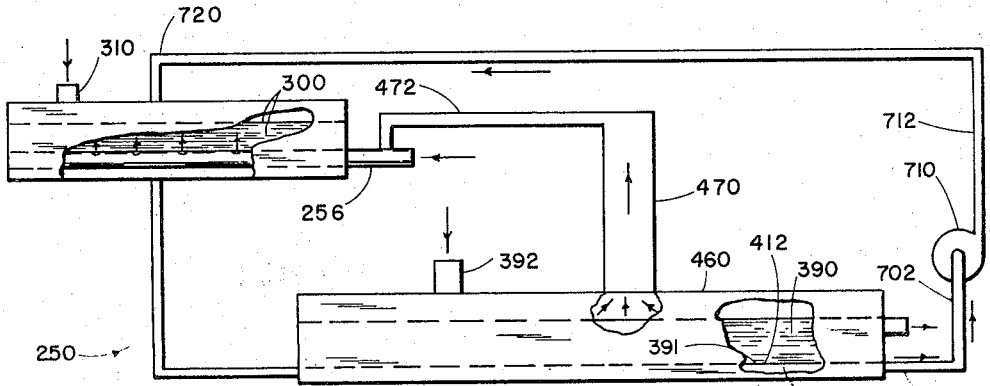
FIG. 2 is a flow diagram showing a Freon system of this invention as used with a gaseous oxygen-providing compound.

In the modification, shown in FIG. 2, it is to be understood that all like-numbered parts are as shown in FIG. 1 and that the remainder of the diagram of the system is as shown in FIG. 1.

When the oxygen containing compound which is to be mixed with Freon is a gas such as ozone, oxygen, or air, then a system 250 shown in FIG. 2 is used in which a first container 252 has the desired one of these three gases inserted into it through an inlet 256, whereby it mixes with the heavy Freon inserted into the first container 252 through an inlet 310 to form a mixture of liquid Freon and the specific one of the three gases which is used, such mixture being shown at 300 in FIG. 2 and being delivered to the second container 380 continuously. A body of water shown at 390 in FIG. 2 reaches the second container 380 through a suitable inlet 392. The body of water 390 is disposed above a lower layer 392' containing the mixture 391, whereby oxygen from the mixture 391 diffuses upwardly, as indicated by the arrow 402 into the body of water 390 all along an interface indicated at 412, which is the place at which the lower surface of the body of water 390 engages the upper surface of the mixture 391.

Since much of the oxygen will pass on through the body of water 390 it can be collected under a hood 460 through the top of which it passes by gravity and through a pipe 470, whereby with the pipe 470 connected to the pipe 256, the gases then pass on to a pipe 472 and from there into the pipe 256 for delivery back into the first container 252.

As thus described, such oxygen as bubbles out of the body of water 390 is diluted through the pipe 472 for recirculation back into the first container 252 and other gaseous oxygen containing compounnd such as ozone, oxygen, or air, is also delivered continuously through the inlet 310 so that Freon which is spent of its oxygen to a large extent and which leaves the second container 380 through an outlet 700, pipe 702, pump 710 and pipe 712, and which latter is connected to an inlet 720 of the first container 252 is spent Freon which then mixes in the first container 252 with both new oxygen containing compound being inserted at the inlet 256 and recirculated oxygen which comes from the pipe 472 to the inlet 256 and into the container 252.

Figure 2A:
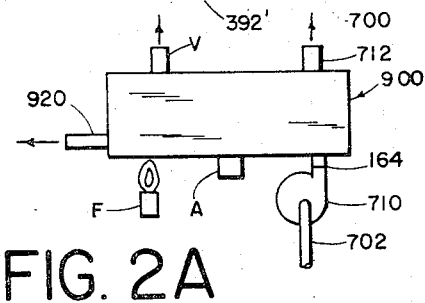
FIG. 2A is a flow diagram modification of the use of the FIG. 2 system with an extractor or separator for extracting Freon from Freon soluble matter.

When a gaseous oxygen containing compound is to be used in a system in which the body of water 390 is specifically waste water containing Freon soluble matter, such as fat, then the diagram of the system would be as indicated in FIG. 2A in which the pipe 702 is connected to the pump 710, but the pump 710 is connected to a pipe 164 leading into a separation assembly generally indicated at 900 which has an outlet pipe 712 which latter is the same pipe seen in FIG. 2, so that the pipe 702 and pipe 712 in the system of FIG. 2A are considered to be attached to the same places as the same pipes are in the diagram of FIG. 2.

The separation assembly 900 has another outlet 920, however, through which the Freon soluble matter is delivered after it has been separated from the Freon by the separation assembly 900.

In any of the processes described herein, the Freon which is used is called a heavy Freon and it is of a type heavier than water and is manufactured under the trade name Freon 113 and Freon TF, both of these products being manufactured by E. I. du Pont de Nemours Fluorocarbon Division.

When fat is referred to herein, it is animal fat that is intended.

The oxygen-providing compound can be liquid ozone in a container under pressure, the outlet of which would then be connected to the inlet 256 of FIG. 2, but that way it is gaseous ozone that re-enters the first container 252.

In this same way, liquid oxygen can be delivered from a pressure tank. In either case, respectively, liquid ozone or liquid oxygen, could be caused to enter the tank 252, although it would quickly be all in gaseous form.

Figure 1A:
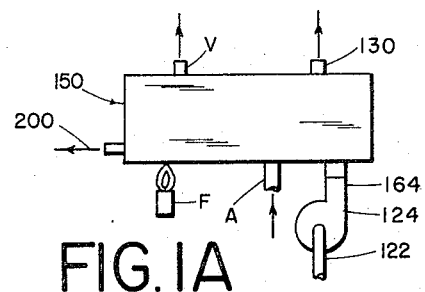
FIG. 1A is a flow diagram modification of the use of the FIG. 1 system with an extractor or separator for extracting Freon from Freon soluble matter.

In the operations of the systems of FIGS. 1A or 2A, the Freon soluble matter which is being extracted by the Freon can be, for example, animal fat, petroleum oil, greases of all kinds, chlorine, sulphur dioxide, hydrogen sulfide, hydrochloric acid, or other organic acids. The extractors 150 and 900 can use conventional extraction principles. For example, heat can be used, as indicated by a flame-providing means F, a vacuum can be used by applying a vacuum means to an outlet V of either of the extractors 150 or 900.

A potential application of $H_2O_2$ dissolved in Freon is being tried on a laboratory scale. Equal portions of Freon and 3% $H_2O_2$ were placed in separatory funnels and vigorously shaken from 10 to 15 seconds then left set for approximately one hour. Fifteen mls. of the lower Freon fraction was added to a B.O.D. bottle and the bottle was then filled with regular dilution water having a dissolved oxygen content (DO) of 7.8 p.p.m. by the Winkler method. Using this same method the DO content of the bottle containing the Freon was raised to 12.1 p.p.m.

This Freon layer in the bottom of the B.O.D. bottle would act as a reservoir source of oxygen at the interface of the two solutions as there would be an equilibrium formed by the $H_2O_2$ between the water and the Freon. As the $H_2O_2$ entered the water phase, its potential oxygen could be utilized by acclimated aerobic bacteria.

The above procedure has advantages in the B.O.D. analysis of heavily polluted industrial wastes where sample seeding is necessary and where the seed has not been acclimated to a $H_2O_2$ treated dilution water. Also, the higher potential of available oxygen, makes possible for lower dilution of sample, thereby increasing the accuracy of the test.

There are potential advantages in applying the above procedures to industrial settling basins. The density of Freon and its solvent powers would hold or float precipitated Freon insoluble matter on this surface while extracting grease, and maintain oxidative conditions from oxygen supplied by the dissolved $H_2O_2$. As this Freon is recycled, reclaimed, and the grease salvaged, the Freon could be recharged with $H_2O_2$ by passing it through a solution of $H_2O_2$. There may be other uses for this combination of oxidizing agent and solvent since the Freon is non-flammable, has a low boiling temperature—approximately 48 degrees C., neutral, and has a density greater than water.

The use of hydrogen peroxide as a source of oxygen is a safe and convenient way to control and utilize oxygen. The amount of oxygen can be measured volumetrically. The addition of 1 ml. of 3% $H_2O_2$ to 1000 gallons of water increases the dissolved oxygen by 14.4 p.p.m., or similarly, 1 gallon of 3% $H_2O_2$ to 1000 gallons of water. The release of oxygen from the peroxide molecule can be controlled, thus minimizing the loss of oxygen by its bubbling out of solution as is the case with aeration.

The value of having a potential or continual supply of oxygen in waste water as it passes through sewer lines is obvious. The only impracticality is the high cost of the $H_2O_2$, which at present is in a state of flux. The use of $H_2O_2$ by industries to treat their effluents, or their use of excess peroxide in various industrial processes where it could be utilized would aid as a cost sharing of the treatment of combined municipal wastes.

Industries could, therefore, with the use of hydrogen peroxide, aid directly or indirectly in treating waste waters or supplies by: treating or preventing many odors, by maintaining a potential supply of oxygen in all waters, and in the polluted waters conveniently maintain a supply so that aerobic bacteria may thrive at the expense of pathogenic organisms and odor-forming anaerobes.

The heavy Freon used in the above process is trichlorotrifluoroethane.

Also gaseous Freon can be blown into a body of waste water containing a Freon soluble matter and the Freon and the Freon soluble matter will then dissolve in each other to form a certain substance and depending on the properties of the Freon soluble material, said certain substance will do one of the following:

(a) sink to the bottom of said body of water,
(b) pass out of the water as a gas, or
(c) remain in the body of water as a suspension.

Removing said substance from the immediate vicinity of said body of water, is the next step, and such removal is done in the following ways: (a) if the substance has sunk, it is removed as above described; (b) if the substance is a gas, then when it passes out from the top of the water, it can be collected in a catching hood disposed above the body of water and removed; (c) if the substance is suspended, then it is removed by one of the following processes: (1) centrifuging, (2) absorption columns, (3) extracting and heating said substance so gaseous Freon bubbles out to separate it from the Freon soluble matter, (4) applying a vacuum to the substance to remove gaseous Freon.

I claim:
1. A process of mixing Freon with at least one oxygen containing compound selected from the group consisting of hydrogen peroxide, ozone, oxygen and air and delivering the mixture so formed into a body of water to which it is desired to deliver oxygen from the said one compound by the diffusion of the oxygen upwardly into said body of water from the Freon after the Freon has settled beneath said body of water.

2. The process of claim 1 in which some of said Freon is removed from said body and again mixed with more of the said one oxygen containing compound, and then redelivered to said body of water.

3. The process of claim 1 in which said Freon is in liquid form and heavier than water and in which said oxygen is delivered to said water by the diffusion of the oxygen upwardly into said body of water from the Freon has settled beneath said body of water whereby the area of the undersurface of said body of water in contact with said mixture is large.

4. The process of claim 1 in which said body of water specifically is waste water containing Freon soluble matter and in which the Freon is used as a solvent to dissolve the Freon-soluble matter from the water, the Freon containing the Freon-soluble matter being continuously drawn off and taken to a further stage, at which latter the said Freon soluble matter and said Freon are separated so that the Freon can then be reused by reinsertion back into the waste water to dissolve more Freon-soluble matter by recycling.

5. The process of claim 1 in which said Freon soluble matter is animal fat.

References Cited

UNITED STATES PATENTS 2,070,856   2/1937   Butterfield _____ 210—63

FOREIGN PATENTS 93,896   4/1960   Netherlands _____ 210—62

SAMIH N. ZAHARNA, Primary Examiner

F. F. CALVETTI, Assistant Examiner

U.S. Cl. X.R.

210—62, 63